US008645494B1

(12) United States Patent
Altman et al.

(10) Patent No.: US 8,645,494 B1
(45) Date of Patent: Feb. 4, 2014

(54) TWO-FILE PRELOADING FOR BROWSER-BASED WEB ACCELERATION

(71) Applicant: Limelight Networks, Inc., Tempe, AZ (US)

(72) Inventors: Tomer Altman, Kiryat Hayim (IL); Ariel Jonatan Birnbaum, Kiryat Motzkin (IL); Erez Yaffe, Tel Aviv (IL); Hemdat Cohen-Shraga, Elkana (IL)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/887,187

(22) Filed: May 3, 2013

Related U.S. Application Data

(60) Provisional application No. 61/794,794, filed on Mar. 15, 2013.

(51) Int. Cl.
  *G06F 15/16* (2006.01)
(52) U.S. Cl.
  USPC .......................................... 709/217; 709/203
(58) Field of Classification Search
  USPC .................................................. 709/217, 203
  See application file for complete search history.

(56) References Cited

U.S. PATENT DOCUMENTS

| | | | |
|---|---|---|---|
| 7,395,355 B2 | 7/2008 | Afergan et al. | |
| 8,122,102 B2 | 2/2012 | Wein et al. | |
| 8,156,419 B2 | 4/2012 | Choudhary et al. | |
| 8,166,079 B2 | 4/2012 | Lewin et al. | |
| 8,321,533 B2 | 11/2012 | Fainberg et al. | |
| 8,346,956 B2 | 1/2013 | Day et al. | |
| 8,402,137 B2 | 3/2013 | Sivasubramanian et al. | |
| 8,447,837 B2 | 5/2013 | Devanneaux et al. | |
| 2004/0088375 A1 | 5/2004 | Sethi et al. | |
| 2010/0262780 A1 | 10/2010 | Mahan et al. | |

OTHER PUBLICATIONS

Han, T. et al., "On Accelerating Content Delivery in Mobile Networks", Retrieved on Jul. 23, 2013 from http://web.njit.edu/~th36/published%20paper/On%20Accelerating%20Content%20Delivery%20in%20Mobile%20Networks.pdf, Oct. 22, 2012, 20 pages, Volume:PP, Issue: 99, IEEE Communications Society.
Brian Douglas Davison, "The Design and Evaluation of Web Prefetching And Caching Techniques", Retrieved on Jul. 23, 2013 from http://www.cse.lehigh.edu/~brian/pubs/2002/thesis/thesis.pdf, Oct. 2002, 329 pages, The State University of New Jersey.

(Continued)

*Primary Examiner* — David Lazaro
(74) *Attorney, Agent, or Firm* — Kilpatrick Townsend & Stockton LLP

(57) ABSTRACT

A system and a method for accelerating delivery of a webpage by using a preloader file during a delay in fetching the web file are disclosed. When an end user makes a request through a client computer for a webpage, a Content Delivery Network (CDN) server sends the client a preloader file. The preloader file contains requests for resources that are likely to be part of the web file. The client downloads the resources, and the resources are saved in a browser cache. The preloader file also directs the client to request the webpage again. While the client is downloading the resources, the CDN server requests the web file from an origin server. The origin server composes the webpage and delivers the webpage to the CDN server. When the client makes a second request for the web file, the CDN server delivers the web file to the client. When the client renders the web file to display the webpage, the client can retrieve the resources from the browser cache.

20 Claims, 14 Drawing Sheets

(56) References Cited

OTHER PUBLICATIONS

Wikipedia, "Web accelerator", Retrieved on Jul. 23, 2013, from http://en.wikipedia.org/wiki/Web_accelerator, Jun. 24, 2013.

Dan Rayburn, "How Dynamic Site Acceleration Works, What Akamai and Cotendo Offer", Retrieved on Jul. 23, 2013 from http://blog.streamingmedia.com/2010/10/how-dynamic-site-acceleration-works-what-akamai-and-cotendo-offer.html, Oct. 18, 2010.

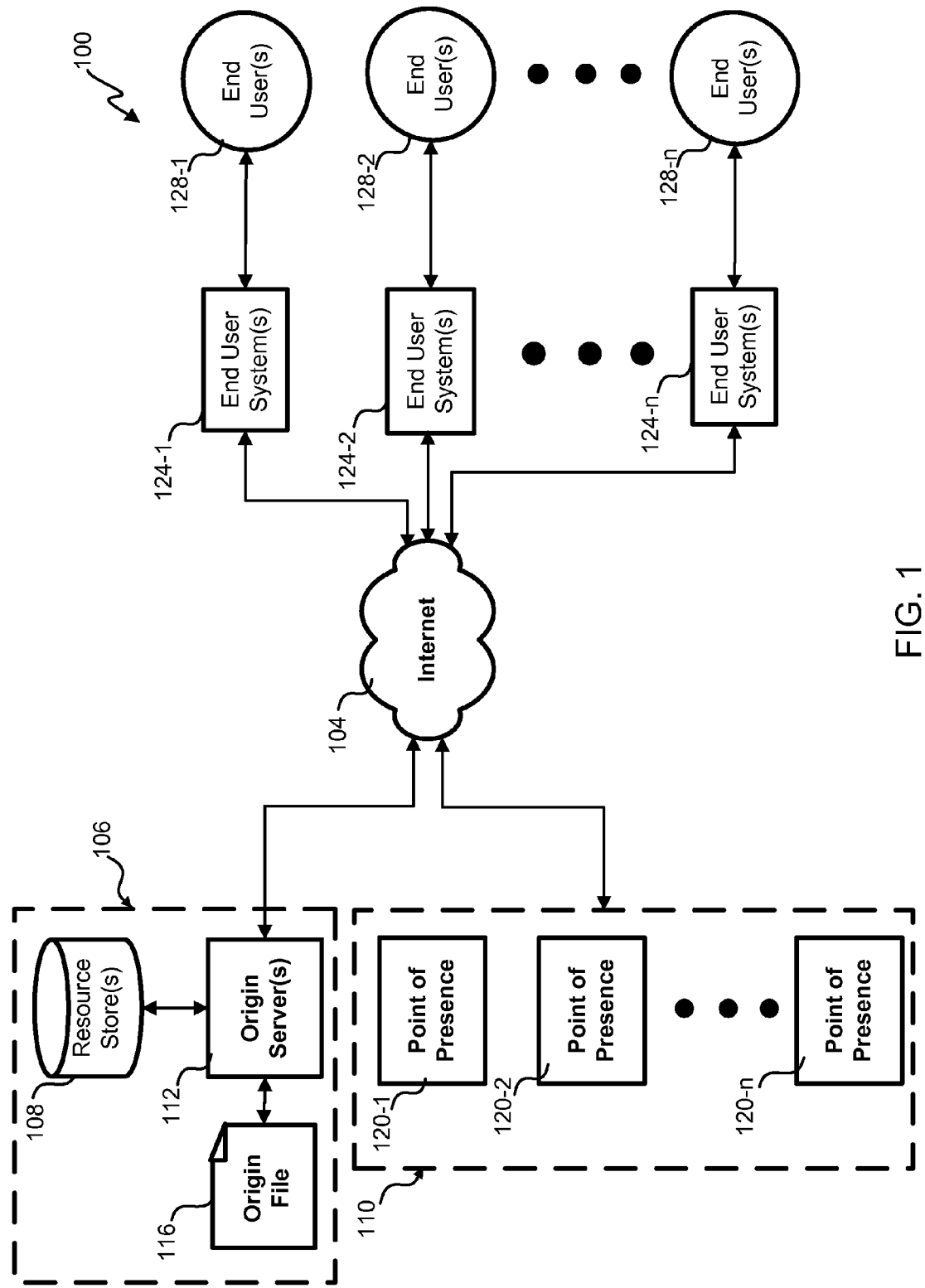

TWO-FILE PRELOADING FOR BROWSER-BASED WEB ACCELERATION

CROSS-REFERENCE TO RELATED APPLICATION

This application claims the benefit of Provisional Application No. 61/794,794, filed Mar. 15, 2013, which is incorporated by reference for all purposes.

BACKGROUND

This disclosure relates in general to techniques for accelerating the delivery and rendering of web files over the Internet.

Webpage designers continue to add increasingly more data to web files. A web file contains instructions for displaying a webpage. Where it was once common for a webpage to have only a few images, it is now common to find webpages with more than a dozen images. Additionally, more webpage designers are using higher-level programming languages. When web files are written in a higher-level programming language, the web file is often written not as efficiently as it could be.

For handling web files that are often data intensive, webpage hosts are turning to Content Delivery Networks (CDNs) to fulfill end-user requests for webpages. A CDN is one or more servers that receive requests from end users and respond to the requests. But adding an additional server between an origin server and the end user can potentially introduce a delay in the delivery and rendering of a web file.

Sometimes a CDN will introduce an instance-specific web file based on an origin web file. For an instance-specific web file, an initial response is added as a new section to the origin web file. The instance-specific web file would then have its own Uniform Resource Locator (URL). But introducing a new URL can break the browser history. Additionally, copying or forwarding the URL to the instance-specific web file can result in a broken link and a web browser not being able to render the origin web file to display a corresponding webpage.

SUMMARY

A system and a method for accelerating delivery of a webpage by using a preloader file during a delay in fetching the web file are disclosed. When an end user makes a request through a client computer for a webpage, a Content Delivery Network (CDN) server sends the client a preloader file. The preloader file contains requests for resources that are likely to be part of the web file. The client downloads the resources, and the resources are saved in a browser cache. The preloader file also directs the client to request the webpage again. While the client is downloading the resources, the CDN server requests the web file from an origin server. The origin server composes the webpage and delivers the webpage to the CDN server. When the client makes a second request for the web file, the CDN server delivers the web file to the client. When the client renders the web file to display the webpage, the client can retrieve the resources from the browser cache.

A system for accelerating the loading of a webpage by providing a preloader file to a client's request for the webpage is disclosed. The system comprises a preloader engine configured to receive a first request from the client for a first file. The first request comprises a first Uniform Resource Identifier (URI), and the first URI identifies the first file. The first file is renderable by a browser as the webpage. The preloader engine determines a second URI, where the second URI identifies a second file. The second file is different from the first file, and the second file is the preloader file. The preloader file is configured to request a first resource for download. The first resource is likely to be a resource of a first plurality of resources of the first file. The preloader file also contains instructions to request the first file again. The preloader engine sends the client a first response, the first response comprises the URI of the preloader file. The preloader engine requests the first file from a server. The preloader engine receives a second request from the client for the first file. The second request comprises a third URI identifying the first file. The preloader engine determines that the second request for the first file is received later in time than the first request for the first file. The preloader engine receives the first file from the server and transmits the first file to the client in response to the second request for the first file. The system also comprises a preloader cache containing a plurality of preloader files.

A method for accelerating the loading of the webpage by providing the preloader file to a client's request for the webpage is disclosed. The method includes receiving a first request from the client for a first file, the first request comprises a first URI. The first URI identifies the first file, wherein the first file is renderable by a browser as the webpage. The method includes determining a second URI, where the second URI identifies a second file. The second file is different from the first file. The second file is the preloader file, and the preloader file is configured to request a first resource for download, where the first resource is likely to be a resource of a first plurality of resources of the first file. The preloader file is also configured to request the first file again. The method includes sending the client a first response, the first response comprising the second URI directing the client to the preloader file. The method includes requesting the first file from a server. The method includes receiving a second request from the client for the first file, where the second request comprises a third URI. The third URI identifies the first file. The method also includes determining that the second request for the first file is received later in time than the first request for the first file; receiving the first file from the server; and transmitting the first file to the client in response to the second request for the first file.

A system and method for accelerating the loading of a webpage by providing a preloader file to a client's request for the webpage is disclosed. The system comprises a preloader engine configured to receive a first request from the client for a first file. The first request comprises a first URI, and the first URI identifies the first file. The first file is renderable by a browser as the webpage. The preloader engine composes a first preloader response. The first preloader response includes instructions for downloading a first resource that is likely to be a resource of the first file. The preloader engine sends the client the first preloader response. The preloader engine requests the first file from a server. The preloader engine composes a second preloader response with additional instructions for downloading a second resource that is likely to be a resource of the first file. The preloader engine sends the client the second preloader response. The preloader engine receives a second request for the client for the first file. The preloader engine receives the first file, or an accelerated version of the first file, from the server. The preloader engine composes a third preloader response. The third preloader response includes the first file, or the accelerated version of the first file. The preloader engine sends the third preloader response to the client.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 1 depicts a block diagram of an embodiment of a content distribution system;

Figure 2A:
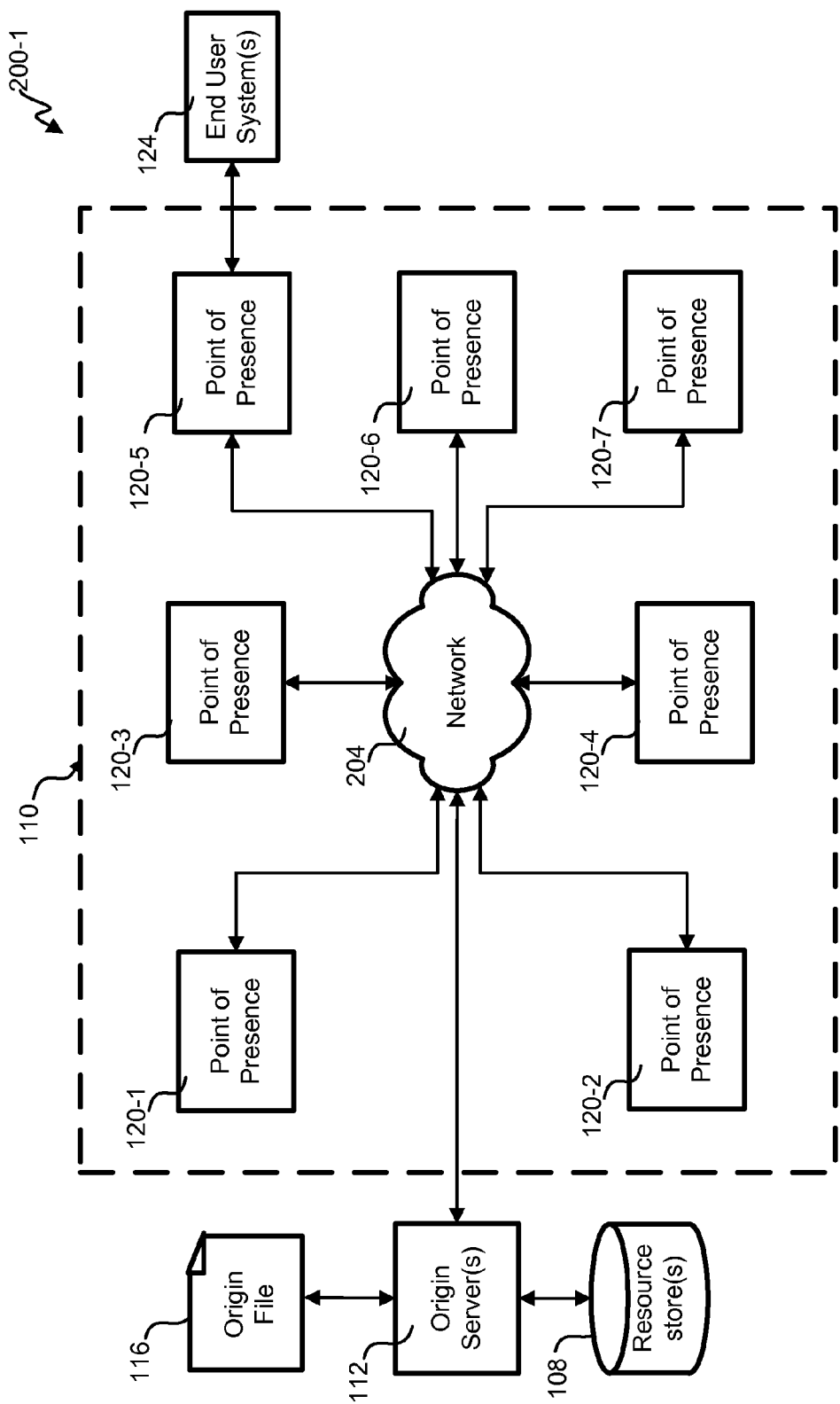
FIGS. 2A and 2B depict block diagrams of embodiments of a web delivery system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Referring first to FIG. 1, a block diagram of an embodiment of a content distribution system 100 is shown where a content originator 106 offloads delivery of content objects to a content delivery network (CDN) 110. In this embodiment, the content distribution system 100 can serve content objects (e.g., JavaScript applets, images, Hypertext Markup Language (HTML), videos, Flash animations, etc.) over the Internet 104 to end user systems 124 by use of caches and optional acceleration techniques.

An end user 128 may request a set of content objects, e.g., by requesting a web file associated with one or more of content objects, such as an HTML file. A web file is a content object that contains instructions for generating a webpage and/or instructions for retrieving other content objects. Content objects that are associated with a web file are considered resources of that web file. A source of each of the content objects and/or the web file may be on an edge server, a host server within the CDN, a resource store 108 of the origin server 112, the origin file 116, or on a cache in another POP 120.

A content originator 106 produces and/or distributes content objects as the originator of content in a digital form for distribution with the Internet 104. The content originator 106 includes an origin server 112, a resource store 108, and an origin file 116. The figure shows a single origin server 112, but it is to be understood embodiments could have multiple origin servers 112 that each can serve content objects. For example, the content originator 106 could have multiple origin servers 112 and assign any number of them to serve the content object. The origin servers 112 for a given origin file 116 could be widely distributed with some even being hosted by the CDN 110. Additionally, it is to be understood embodiments could have multiple resource stores 108. For example, one origin server 112 could have multiple resource stores 108. In another example, resources to a first origin file 116 associated with a first origin server 112 could be kept in a resource store 108 of a second origin server 112.

Although this figure only shows a single content originator 106 and a single CDN 110, there may be many of each in other embodiments. The content object is any web file or content stream and could include, for example, video, pictures, advertisements, applet, data, audio, software, HTTP content, and/or text. The content object could be live, delayed, or stored. Throughout the specification, references may be made to a content object and/or content, but it is to be understood that those terms could be generally used interchangeably wherever they may appear.

Many content originators 106 use the CDN 110 to deliver resources and origin files 116 over the Internet 104 to end users 128. When a content object or the origin file 116 is requested by an end user 128, the CDN 110 may retrieve the content object from the resource store 108 for loading in a cache or hosting for a period of time. The origin file 116 could be hosted in the resource store 108 or separately. In the embodiment shown, the origin file 116 is stored separately from the resource store 108. Alternatively, the origin server 112 may directly provide resources and the origin file 116 to the CDN 110 for hosting, i.e., in advance of a first request or in servicing the first request.

The origin file 116 is a web file that is published by the content originator 106. The origin file contains instructions that, when rendered, displays a webpage referred to as the origin webpage. A webpage is a visual display of a web file after the web file is rendered by a browser. Thus the rendering of the origin file by a browser displays the origin webpage.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 124. A wide area network (WAN), the Internet 104 and/or other backbone may couple the POPs 120 with each other and also couple the POPs 120 with other parts of the CDN 110.

When an end user 128 requests a resource, or the origin file 116, through its respective end user system 124, the request is passed either directly or indirectly via the Internet 104 to the content originator 106. The request, for example, could be an HTTP Get command sent to an IP address of the content originator 106 after a look-up that finds the IP address. The content originator 106 may also be the source or re-distributor of resources for the origin file 116. The origin server 112 can redirect content requests to any CDN 110 after they are made, or can formulate the delivery path beforehand when a web file is formulated to point to the CDN 110. In any event, the request for content is handed over to the CDN 110 for fulfillment in this embodiment.

Once the request for content is passed to the CDN 110, the request is associated with a particular POP 120 within the CDN 110. The particular POP 120 then assigns or routes the request to an edge server. The particular POP 120 may retrieve the origin file 116 and/or resources through the origin server 112. Alternatively, the origin server 112 may directly provide the origin file 116 and resources to the CDN 110 and its associated POPs 120, i.e., in advance of the first request. In this embodiment, the content objects are provided to the CDN 110 and stored in one or more CDN servers such that the requested content may be served from the CDN 110. The resource store 108 holds a copy of content objects for the content originator 106.

An edge server serving the request to the end user system 124 may access the origin file 116 and/or resources either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 124 for content may result in requests for content from one or more servers in the CDN 110. A CDN server (e.g., an edge server, peer servers, an origin server, etc.) may analyze requested content objects (e.g., requested HTML files), determine versions of the content objects that are cached locally, and transmit to other CDN servers a modified request for content objects.

The end user system 124 processes the content for the end user 128 upon receipt of the content object. The end user system 124 could be a personal computer, media player, handheld computer Internet appliance, phone, IPTV set top, streaming radio, or any other device that can receive and play content objects. An end user system 124 is also sometimes referred to as a client. End user system 124 and client can generally be used interchangeably wherever they may appear. In some embodiments, a number of end user systems 124 can be networked together sharing a single connection to the Internet 104. Changes could be made by the CDN 110 that do not affect the end user realization of the content except to speed delivery.

With reference to FIG. 2A, a block diagram of an embodiment of web delivery system 200-1 is shown. In this example, there are seven POPs 120 all interconnected by a network 204. The origin server 112 is also connected to the network 204. The network 204 may include both private WAN or Internet 104 elements to allow communication between the POPs 120 and the origin server 112.

In the depicted example, the end user system 124 requests a web file and/or resource. The request is assigned to a fifth POP 120-5. The request is assigned to the fifth POP 120-5 based on a proximity between the end user system 124 and the fifth POP 120-5, i.e., the fifth POP 120-5 was the closest POP 120 to the end user system 124 in a network context. But there are other ways a POP 120 can be assigned to a request by an end user system 124. A POP could be selected based on load balancing within the CDN 110, a quality of service requirement, or other method. After receiving the request, the fifth POP 120-5 would check a cache in the fifth POP 120-5 for the web file and/or resource. If the web file and/or resource is not in the cache of the fifth POP 120-5, then the fifth POP 120-5 would request the web file and/or resource from the origin server 112.

There is a delay in the fifth POP 120-5 receiving the origin file 116 based on the location of the fifth POP 120-5, the quality of service of the network 204 connecting the fifth POP 120-5 to the origin server 112, and the time it takes the origin server 112 to process the request from the fifth POP 120-5. For example, take an origin server 112 located in San Francisco and a first POP 120-1 located in San Diego. If the fifth POP 120-5 is located in Dubai, it will likely take longer for the fifth POP 120-5 to receive a response from the origin server 112 than the first POP 120-1 located in San Diego.

Figure 2B:
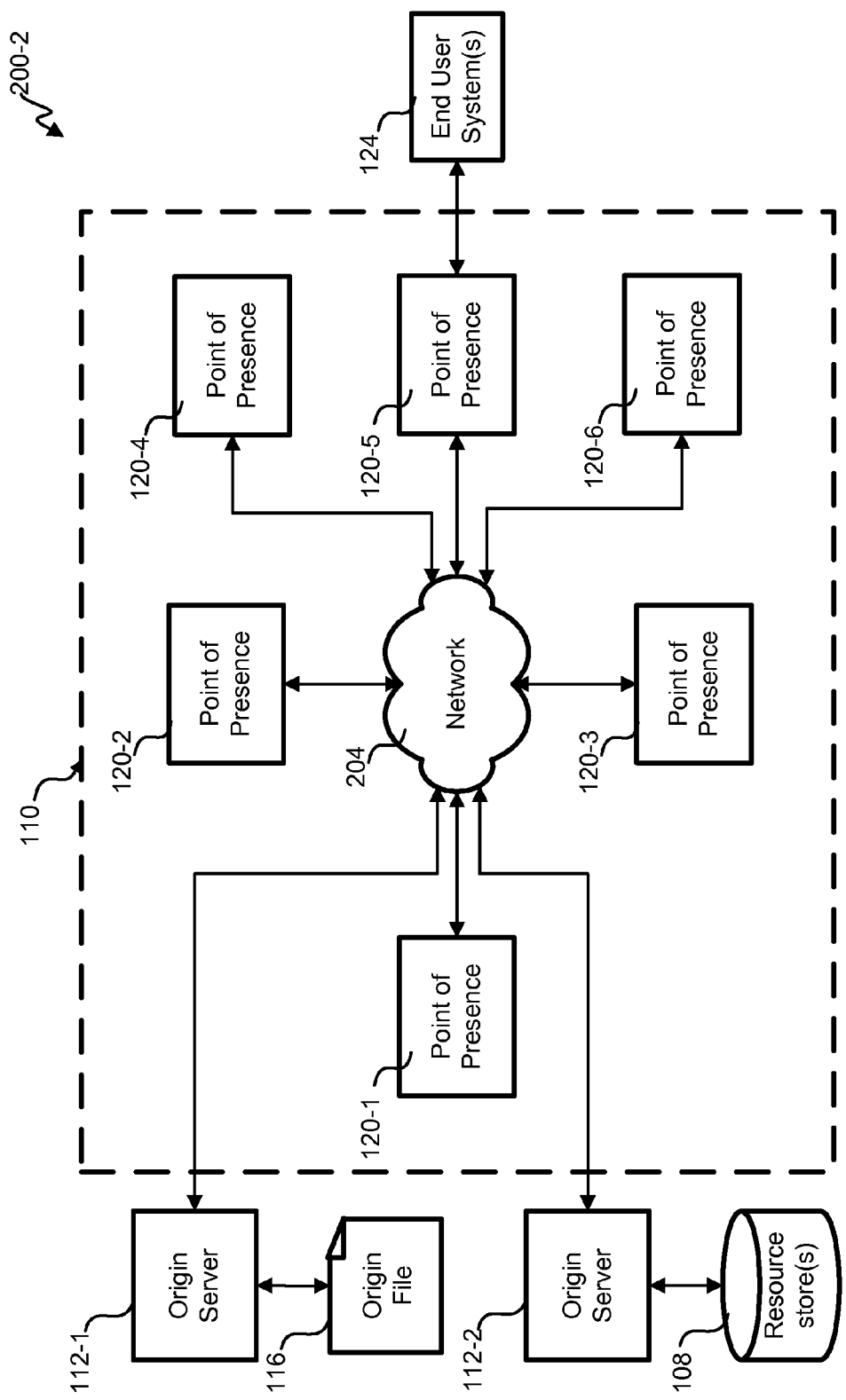

Referring next to FIG. 2B, a block diagram of an embodiment of web delivery system 200-2 is shown. In this embodiment, a first origin server 112-1 and a second origin server 112-2 are connected to the network 204. The first origin server 112-1 contains the origin file 116, and the second origin server 112-2 contains the resource store 108. There are six POPs 120 that are part of the CDN 110, and all six POPs 120 are connected to the network 204.

An end user system 124 is assigned to the fifth POP 120-5 of the CDN 110. The end user system 124 requests a first web file corresponding to the origin file 116. If the fifth POP 120-5 does not have a copy of the origin file 116 cached, the fifth POP 120-5 requests the origin file 116 from the first origin server 112-1. The fifth POP 120-5 then sends a copy of the origin file 116 to the end user system 124. The end user system 124 attempts to render the origin file 116. In attempting to render the origin file 116, the end user system is instructed to request a first resource. The end user system 124 requests the first resource from the fifth POP 120-5. But the request for the first resource does not necessarily need to go through the fifth POP 120-5. The request for the first resource could have been routed through a different POP 120, such as the fourth POP 120-4. The fifth POP 120-5 will check the cache of the fifth POP 120-5. If the fifth POP 120-4 does not have the resource cached, then the fifth POP 120-5 requests the first resource from the second origin server 112-2. In this way, the origin file 116 and resources can be spread out among the network 204.

Figure 3:
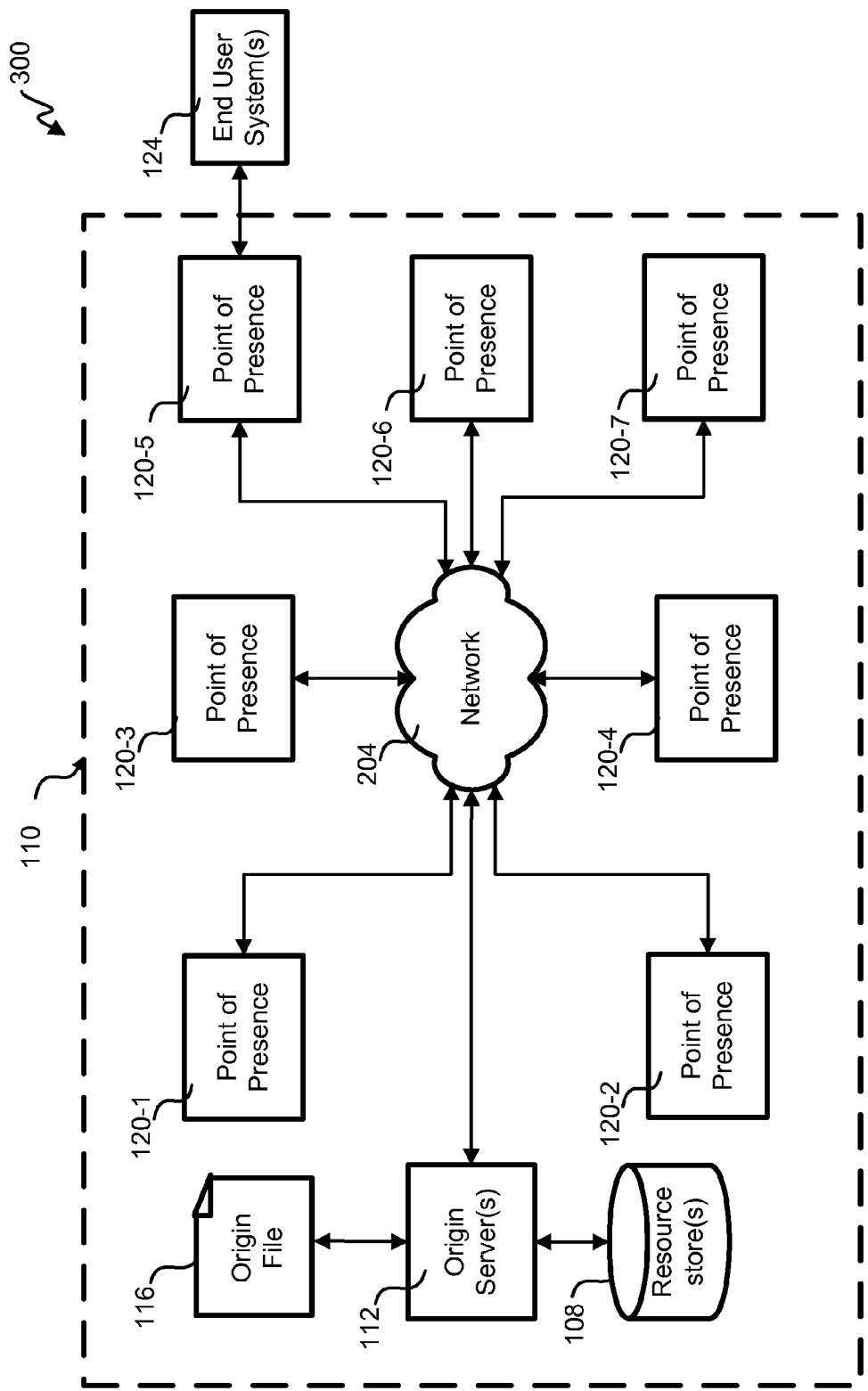
FIG. 3 depicts a block diagram of another embodiment of a web delivery system.

Referring next to FIG. 3, a block diagram of an embodiment of web delivery system 300 is shown. This figure is similar to FIG. 2A except the origin server 112, origin file 116, and resource store 108 are inside the CDN 110 instead of outside the CDN 110. In this embodiment, the content originator 106 delegated to the CDN 110 all duties of distributing the content. The various embodiments of FIGS. 2A, 2B, and 3 convey that the origin server 112, resource store 108, and origin file 116 may be placed in a multiple of different configurations inside and outside the CDN 110. The CDN will route requests and content objects accordingly.

Figure 4A:
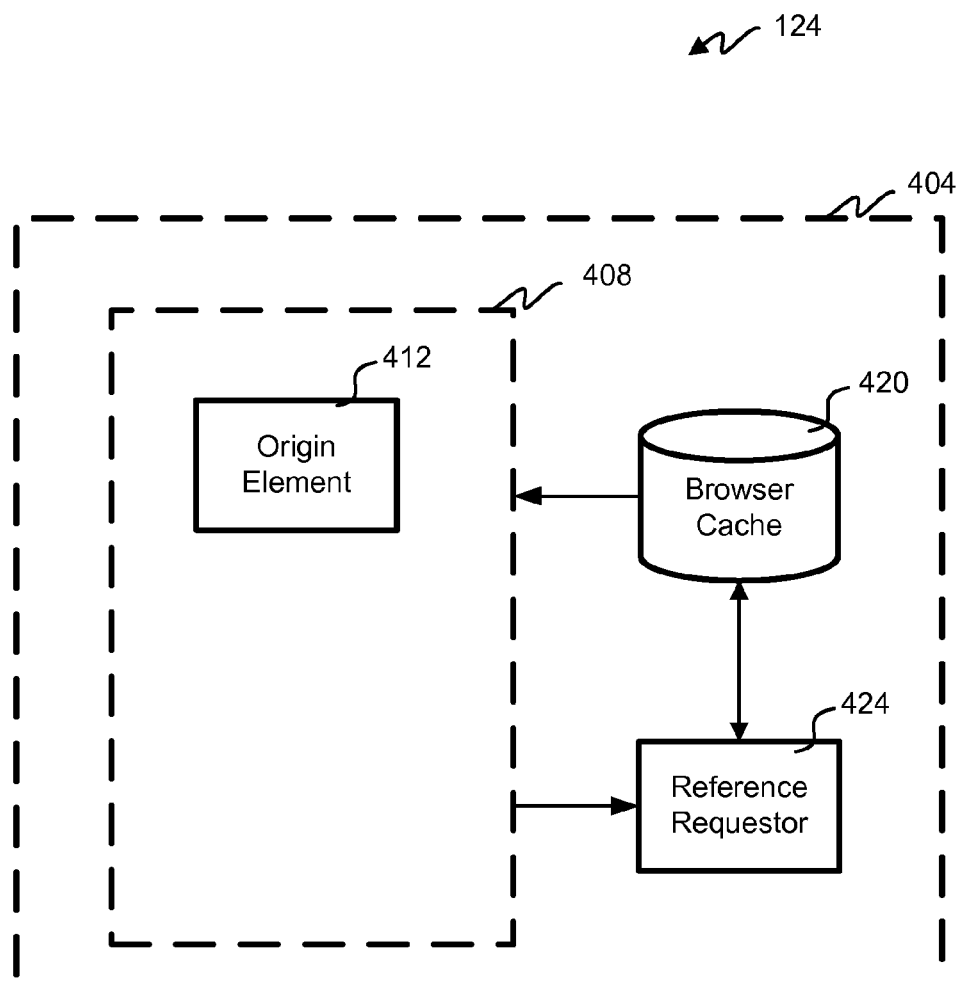
FIGS. 4A and 4B depict block diagrams of embodiments of a browser in an end user system.

Referring next to FIG. 4A, a block diagram of an embodiment of portions of the end user system 124 is shown. In this embodiment, the end user system 124 has a browser 404 for retrieving resources and rendering web files to display a webpage for the end user 128. The browser 404 runs in the application layer of the end user system 124. The browser 404 retrieves content objects and/or renders a web file in real time in a webpage environment 408. The browser 404 may be a web browser such as Mozilla,™ Firefox,™ or Internet Explorer™. The browser 404 may also be a mobile browser. Mobile browsers are also referred to as microbrowsers, minibrowsers, and wireless internet browsers. Mobile browsers are common in wireless handheld devices. Or the browser 404 may be a part of, or a plug-in for, another application that has a cache and retrieves content objects and/or renders a web file to display a webpage for the end user 128.

The browser 404 has a browser cache 420 to store web files, resources, and other content objects. Generally, a browser 404 stores content objects in the browser cache 420 that the browser 404 has recently downloaded. Content objects in the browser cache 420 are organized by Uniform Resource Identifiers (URIs). A URI is a string of characters that identifies a content object. A URI could be a Uniform Resource Locator (URL) and/or a Uniform Resource Name (URN). For example, http://www.google.com, is a URL to the web file of Google's™ Internet search engine ("Google™ web file"). When an end user 128 enters the URL of the Google™ web file into the browser 404, the browser 404 requests and renders the Google™ web file to display a webpage. The webpage has a Google™ logo on it. The Google™ logo is an image, and thus the Google™ logo is a resource of the Google™ web file. The Google™ logo has its own URI. After retrieving the Google™ web file and the Google™ logo, the browser 404 would save both to the browser cache 420. When the end user enters http://www.google.com into the browser 404 a second time, the browser first checks for the Google™ web file in the browser cache 420. As the browser 404 renders the Google™ web file, the Google™ web file will request the Google™ logo as a resource. The browser 404 will first check the browser cache 420 for the URI corresponding to the Google™ logo before requesting the Google™ logo from a server.

The webpage environment 408 is where the browser 404 renders a web file to display a webpage for the end user 128. After a browser 404 receives a web file, the browser 404 reads an origin element 412 of the web file. Web files are commonly written in a runtime language such as HTML or JavaScript™. Different acceleration techniques modify, delete, and add to parts of the origin file 116. The origin element 412 is a part of the origin file 116 that remains unchanged. If no acceleration is used, then the origin element 412 is equivalent to the origin file 116. The browser 404 runs the origin element 412. During the running of the origin element 412, the origin element 412 contains instructions for the browser 404 to download one or more resources.

When a resource is called for in the webpage environment 408, the request for the resource first goes to a reference requestor 424. The requestor contains a list of content objects in the browser cache 420, organized by URI. The reference requestor 424 would query the list of content objects for a URI of the resource. If the URI of the resource is on the list of content objects stored in the browser cache 420, then the browser 404 retrieves the resource from the browser cache 420 and brings the resource into the webpage environment 408. If the resource is not in the browser cache 420, then the browser 404 requests the resource from the POP 120. After the browser 404 receives the resource, the browser 404 saves a copy of the resource in the browser cache 420. The list of content objects maintained by the reference requestor 424 is then updated with the URI of the resource.

Figure 4B:
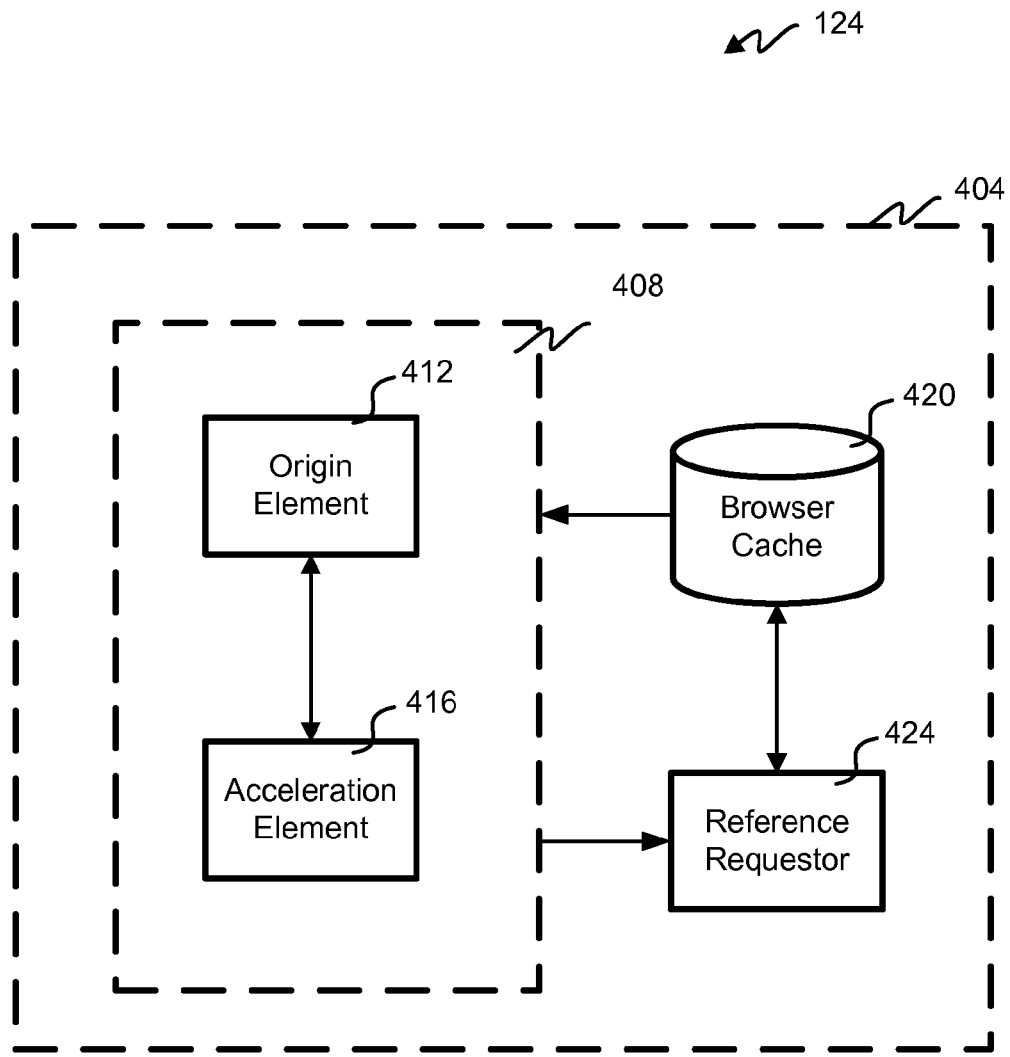

With reference to FIG. 4B, an embodiment for a browser 404 of an end user system 124 is shown. This embodiment differs from the embodiment shown in FIG. 4A in that it has an addition of an acceleration element 416 in the webpage environment 408. The acceleration element 416 is a part of a web file and contains instructions for creating a part or all of a webpage. The acceleration element 416 is added by an acceleration engine. For example, an origin file 116 may contain instructions for three separate requests for three separate images. The acceleration engine can combine the three images into one combined file. The acceleration engine can then remove the three separate requests for the three separate images and add one request for the combined file, thus creating a new web file. Additionally, the acceleration engine can add instructions to the new web file for how to handle the combined image.

The parts of the new web file that the acceleration engine modified is the acceleration element 416. The origin element 412 and the acceleration element 416 do not need to be isolated from each other. In a given web file, parts of the acceleration element may be intermixed with parts of the origin element. For example, an origin file 116 could have ten images. The acceleration engine could combine image one and image two into a first image file; combine image four and image five into a second image file; and combine image nine and image ten into a third image file. The acceleration engine would then remove requests for images one, two, four, five, nine, and ten. The acceleration engine would add a request for the first image file, as part of the acceleration element 416, before a request for the third image; insert a request for the second image file, as another part of the acceleration element 416 between the request for the third image and a request for the sixth image; and add a request for the third image file, as still another part of the acceleration element 416 after a request for the eighth image. Thus the origin element 412 and the acceleration element 416 would be intermixed.

Figure 5A:
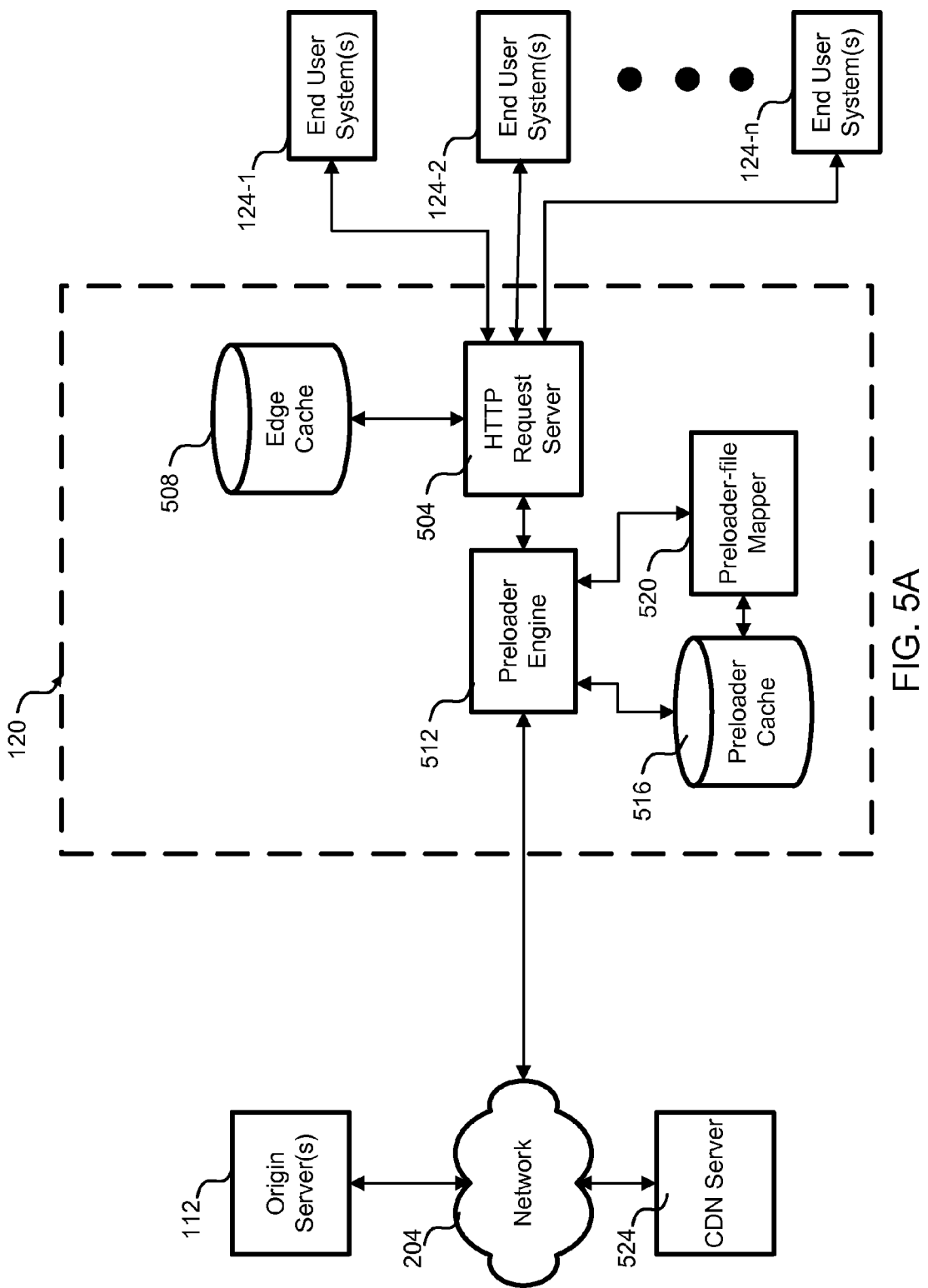
FIGS. 5A, 5B, and 5C depict block diagrams of embodiments of a Point of Presence (POP) with a preloader engine.

Referencing next to FIG. 5A, a block diagram depicts an embodiment of a POP 120 interfaced with the network 204 and multiple end user systems 124. The POP 120 comprises an HTTP request server 504, an edge cache 508, a preloader engine 512, a preloader cache 516, and a preloader-file mapper 520. The HTTP request server 504 receives requests for web files from end user systems 124. The first request is an HTTP request. HTTP requests generally include a URI identifying a web file and several HTTP request headers. There are currently over thirty different HTTP request headers in use. Examples of HTTP request headers include: Allow, Connection, Cookie, Referer [sic], DNT, User-Agent, DNT, Accept, Accept-Charset, Accept-Datetime, Accept-Encoding, Authorization, Host, If-, and TE. The HTTP request server 504 could be a server computer, an edge server, or part of an edge server. When the HTTP request server 504 receives a first request for a first web file from an end user system 124, the HTTP request server 504 checks the edge cache 508 for the first web file. The edge cache 508 stores content objects for the POP 120. If the first web file is not found in the edge cache 508, the HTTP request server 504 transmits the first request to the preloader engine 512.

The preloader engine 512 could be a server computer or part of the edge server. When the preloader engine 512 receives the first request, the preloader engine 512 determines whether there has been an earlier request for the first web file from the end user system 124. If there has not been an earlier request for the first web file from the end user system 124, the preloader engine 512 makes a second request for the first web file. The preloader engine 512 requests the first web file via the network 204 from the origin server 112 or another CDN server 524.

Either before or after making the second request for the first web file, the preloader engine 512 composes a preloader response. The preloader response is sent to the end user system 124. The preloader response could be an HTTP redirect to a preloader file and/or instructions written in a scripting language. For a redirection (e.g., HTTP 303 redirect), the preloader response comprises a URI of the preloader file. The preloader engine 512 can encrypt the preloader response or portions of the preloader response, such as encrypting the URI of the preloader file. The end user system 124 then requests the preloader file using the URI of the preloader file. For instructions written in a scripting language (e.g., JavaScript™), the instructions direct the browser 404 to download one or more resources that are likely to be requested by the first web file. The instructions written in the scripting language further direct the browser 404 to request the first web file again using a URI of the first web file. In one embodiment, the preloader response also includes an application for a temporary display of one or more content objects while the first web file is being retrieved. The temporary display could include video, audio, an interactive game (including a quiz or trivia), status bar, animation, and/or advertisement(s).

The preloader file is a web file that contains instructions for the browser 404. The instructions include downloading a list of resources that are likely to be used in the rendering of the first web file. The preloader file also contains instructions for the browser 404 to request the first web file again, a third request for the first web file. The third request is a request from the end user system 124 to the HTTP request server 504. The third request includes a URI of the first web file. In one embodiment, the URI of the first web file in the first request and the URI of the first web file in the third request are the same. The preloader file could be constructed automatically based on statistics of prior requests routed though the CDN 110 or manually. In the present embodiment, the preloader file is constructed before the first request and is stored in the preloader cache 516. In another embodiment, the preloader file also contains instructions for the browser 404 to modify an HTTP request header of the third request for the first web file. The instructions to modify the HTTP request header are instructions to include the URI, or portions of the URI, of the preloader file in the referer HTTP header of the third request. In some embodiments the preloader file loads more quickly into the browser 404 than the first web file. In one embodiment, the preloader file is written in HTML code using HTML constructs to instruct the browser 404 to request resources and/or request the first web file again. In another embodiment, comprises a scripting language such as JavaScript to provide instructions.

To identify the preloader file, the preloader engine 512 queries a preloader-file mapper 520. The preloader-file mapper 520 contains a list of a first set of URIs corresponding to a plurality of cached preloader files and a second set of URIs corresponding to a plurality of web files. The first set of URIs, corresponding to the plurality of cached preloader files, is mapped to the second set of URIs, corresponding to the plurality of web files. A particular preloader file could be mapped to a particular website domain, sub domain, or specific web page. For example, one preloader file could be created for all requests where a URI contains "Wikipedia.org." In another example, one preloader file could be created for the specific web page: http://en.wikipedia.org/wiki/Programming. A particular preloader file could be different between different POPs 120. For example, referring back to FIG. 2A, the origin page 119 is located in San Francisco, the first POP 120-1 in San Diego, and the fifth POP 120-5 in Dubai. The fifth POP 120-5 in Dubai could have first preloader file for a given URI that is different than a second preloader file in the first POP 120-1 for the given URI. The first preloader file could call for more resources than the second preloader file because there will likely be a greater delay in retrieving the origin file 116 by the fifth POP 120-5.

Preloader files are stored in a preloader cache 516. The preloader cache 516 could store preloader files in a memory of its own or the preloader cache 516 could be part of the edge cache 508. When the end user system 124 requests the preloader file, the HTTP request server 504 retrieves the preloader file (through the preloader engine 512) from the preloader cache 516. The HTTP request server 504 then delivers the preloader file to the end user system 124. Additionally, when the preloader engine 512 creates a new preloader file, the preloader engine 516 stores the preloader file in the preloader cache 516.

Figure 5B:
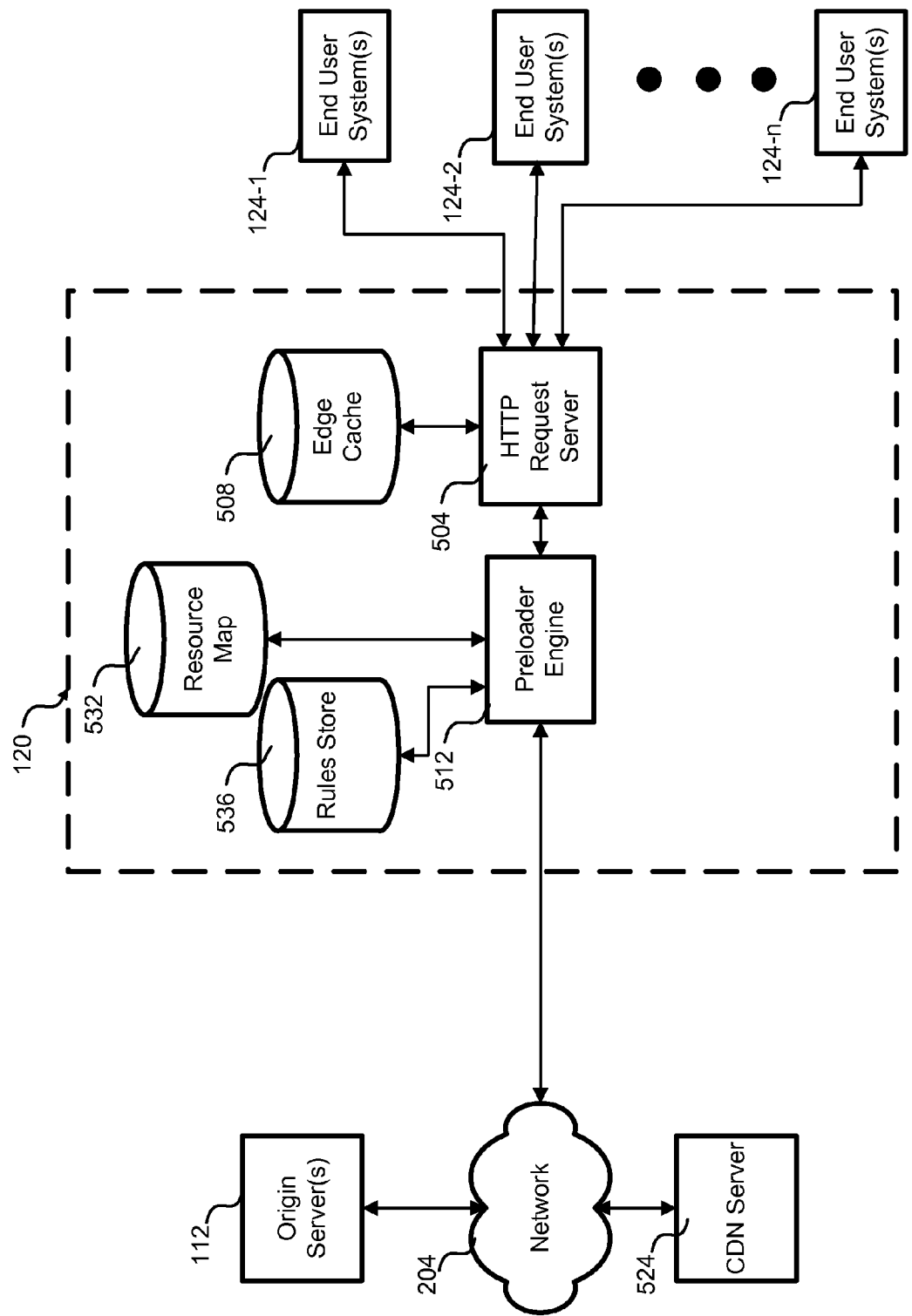

Referring next to FIG. 5B, a block diagram depicts an embodiment of a POP 120 similar to FIG. 5A, but comprising a resource map 532 and a rules store 536 instead of the preloader cache 516 and the preloader-file mapper 520. This embodiment allows the preloader engine 512 to dynamically create the preloader file. In this scenario, a first client that requests the first web file, and a second client that requests the first web file, each receive a different preloader file.

The resource map 532 comprises a list of the second plurality of URIs, corresponding to web files, and maps the second plurality of URIs to one or more resources. Additionally, the resource map 532 can contain response times between the POP 120 and different domains; the connection speed between the end user system 124 and the POP 120; and information about the end user system 124, such as type of browser 404 (e.g., Internet Explorer™) and size of the browser cache 420. The resource map 532 can further contain information about the one or more resources, such as location, size, priority, and popularity.

Referring to Table I, an example of a subset of information contained in the resource map 532 is given. The subset of information is the response time between the POP 120 and various domains. For example, the response time between the POP 120 and Franklin.info is 430 milliseconds (ms). The preloader engine 512 can estimate how long it will take to receive a response from the origin server 112 based on response times. The response time can be static, such as an average response time based on several days. Or the response time can be dynamic, such as updating the response time with the response time of a previous request or a rolling average of the last five requests to a particular domain.

TABLE I

| Response Time | | |
|---|---|---|
| Domain | Location | Response Time (ms) |
| 104.18.640.1 | Tempe | 230 |
| Franklin.info | East Bay | 430 |
| Blue.Realure.com | Denver | 215 |
| Limelight.com | San Jose | 205 |
| Townsend.com | Atlanta | 200 |
| Limelight.net/Aus/ | Austin | 175 |
| Sidewalkpaint.com | San Diego | 250 |
| media.Samba.org | London | 750 |
| ... | ... | |
| USPTO.gov | Alexandria | 220 |

The rules store 536 contains one or more criteria for how to generate the preloader file. The preloader engine 512 reads the one or more criteria and then applies the one or more criteria to generate the preloader file. For example, a first criterion from the rules store 536 could stipulate that the largest resources for a given URI of a web file should be retrieved first. A second rule could be to estimate an amount of time it will take to receive the first web file and create the preloader file to only request as many resources that the end user system 124 will likely be able to retrieve in the amount of time. For the second rule, the preloader engine 512 could use the response time of domains and connection speed between the POP 120 and the end user system 124 to estimate the amount of time. From the resource map 532, the preloader engine 512 could determine the sizes of resources.

A third criterion from the rules store 536 could stipulate not to add resource requests to the preloader file for resources that are in the edge cache 508 and/or the browser cache 420. For the third criterion, the preloader engine 512 could estimate if a given resource is in the browser cache 420. For example, if the preloader engine 512 identified that the end user system 124 was using Internet Explorer 8™, the preloader engine 512 could estimate that the browser cache was 50 megabytes (MB) because the default cache size for Internet Explorer 8™ is 50 MB. The preloader engine 521 could track the size and time of other resources downloaded by the end user system 124. The preloader engine 521 could then store the size and time of the other resources downloaded by the end user system 124 in the resource map 532. If a resource was recently downloaded by the end user system 124, the preloader engine 512 can compare the size of the browser cache 420 to a size of other files and resources downloaded after. If the size of other files and resources, minus the size of the recently downloaded resource, does not exceed the size of the browser cache 420, then the preloader engine 512 can estimate that the recently downloaded resource is in the browser cache 420. The Preloader engine 512 could also check the browser cache 420 for what resources are in it.

A fourth criterion in the rules store 536 could stipulate to create a preloader file with a limited number of resource at a time (e.g., download two resources then request the preloader engine 512 to provide instructions). The preloader engine 512 could then create another preloader file with more resources. The preloader engine 512 could keep providing preloader files until a number of preloader files has been reached and/or a timer reaches a set value. The set value could be static or dynamically determined based on information known to the preloader server 512, the end user system 124, or both. In another embodiment, the rules store 536 could stipulate to create a preloader file with a set number of resources and then request the first web file again. By giving only one resource at a time in the preloader file, the end user system 124 would download one resource and then request the first web file again. The preloader engine 512 could check if the preloader engine 512 had received the first web file from the origin server 112. If the preloader engine 512 had not received the first web file from the origin server, then the preloader engine 512 could create another preloader file with a second resource and an instruction to request the first web file again after downloading the second resource. The end user system 124 would keep requesting another resource until the preloader engine 512 could deliver the first web file.

A fifth criterion in the rules store 536 could stipulate to create a preloader file where resources that are located further away from the POP 120 or end user system 124 are downloaded first. The preloader engine 512 could receive from the resource map 532 which resources are further away based on a location of the resource. In another embodiment, the preloader engine 512 could create a preloader file where resources that are located closer to the POP 120 or end user system 124 are downloaded first.

Figure 5C:
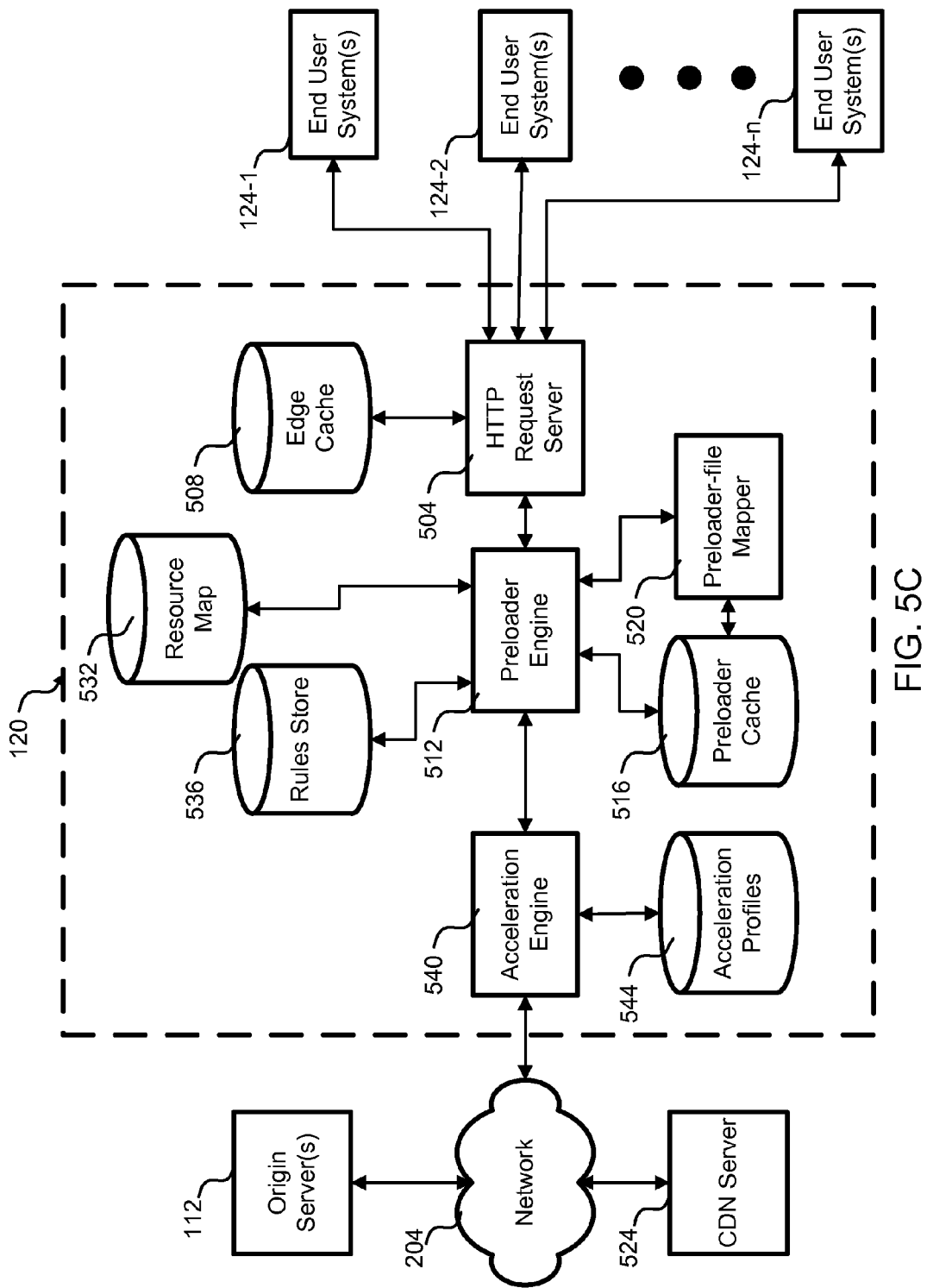

Referring next to FIG. 5C, a block diagram depicts an embodiment of a POP 120 comprising the resource map 532, the rules store 536, the preloader cache 516, and the preloader-file mapper 520, in addition to an acceleration engine 540 and acceleration profiles 544. This embodiment combines the functionality of embodiments described in FIGS. 5A and 5B. The preloader engine 512 has the ability to identify preloader files that are already created, as well as create preloader files after receiving a request for a web file. Additionally, the acceleration engine 540 allows the POP 120 to implement various acceleration techniques, such as compression, code optimization, filtering, etc.

The acceleration profiles 544 contains a list of acceleration techniques for the acceleration engine to use. For example, a first acceleration technique may be used when delivering a web file from a first origin server 112, but a second acceleration technique used when delivering a web file from a second origin server 112.

Figure 6A:
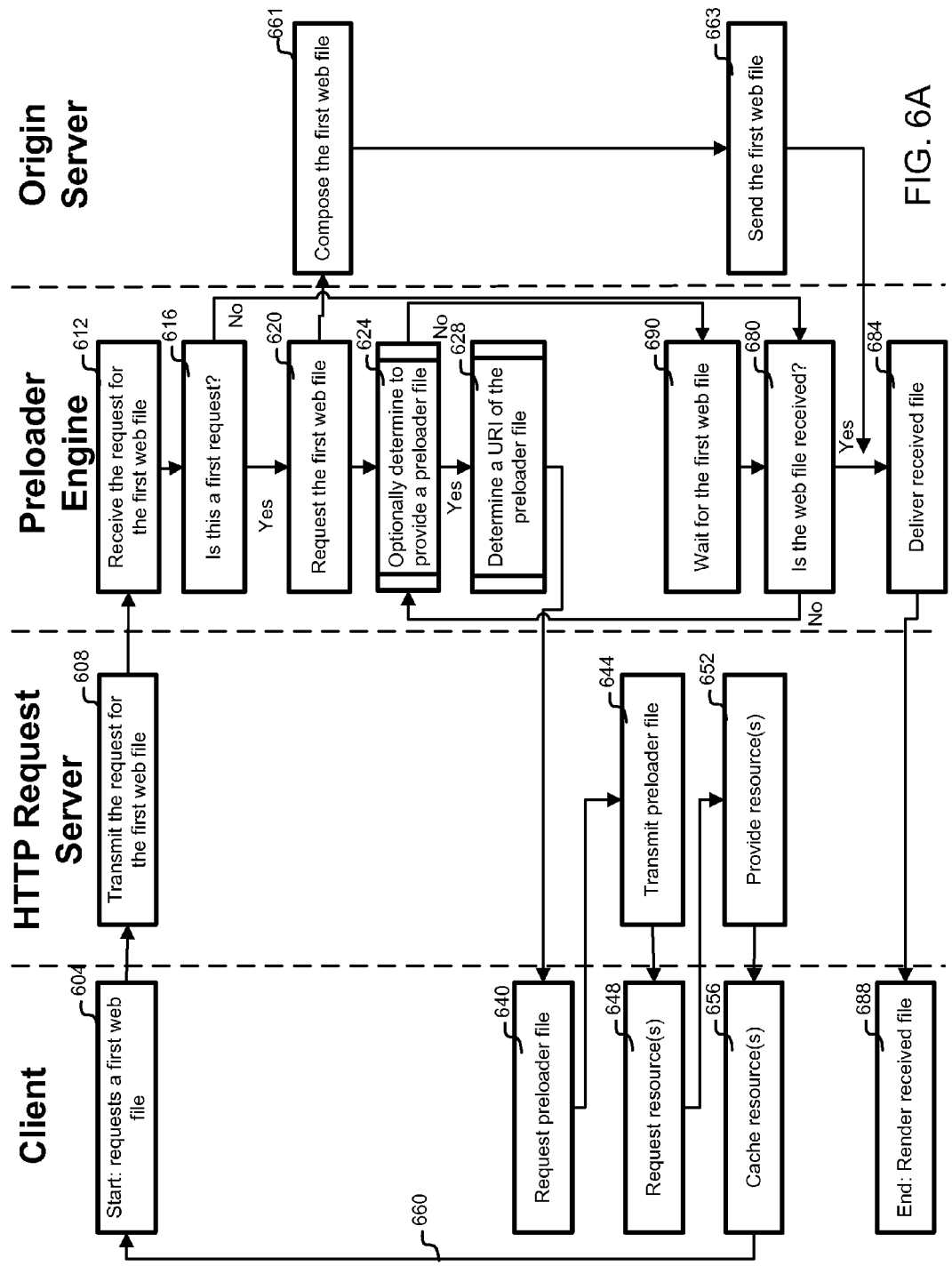
FIGS. 6A and 6B illustrate swim diagrams of embodiments for a process to deliver a preloader file in response to a request for a webpage.

Referring next to FIG. 6A, an illustration of a swim diagram for an embodiment of a process for providing a preloader file is shown. The diagram starts in block 604 where a client computer requests the first web file. The client is the end user system 124. The request is a first request for the first web file. The first request, for the first web file, comprises a first URI that identifies the first web file.

The HTTP request server 504 receives the first request. The HTTP request server 504 checks the edge cache 508 for the first web file. If the first web file is not in the edge cache 508, the HTTP request server 504, in block 608, transmits the first request to the preloader engine 512. In block 612, the preloader engine 512 receives the first request for the first web file. In block 616, the preloader engine 512 determines whether or not the preloader engine 512 has received an earlier request for the first web file from the client. In one embodiment, the preloader engine 512 analyzes the HTTP request headers of the first request, such as the referer header. If the referer header is blank, or contains an unknown URI, then the preloader engine 512 treats the first request as if there were no earlier requests for the first web file from the client and the process flows to block 620. But if the preloader engine 512 determines that there was an earlier request for the first web file then the process flows to block 680.

In block 620, the preloader engine 512 requests the first web file from the origin server 112. And the origin server, in block 661, composes the first web file. In composing the first web file, the origin server could be updating URIs to new content objects and/or changing the look and feel of the webpage based on information about the end user 128. After the origin server 112 finishes composing the first web file, the origin server 112 sends the first web file to the preloader engine 512, block 663.

Returning to block 620, after the preloader engine 512 request the first web file from the origin server 112, the preloader engine 512 may optionally determine whether to provide the preloader file to the client, block 624. For example, if the origin server 112 is really close to the preloader engine 512, if the first web file is relatively simple, or if the resources are in either the edge cache 508 or browser cache 420, the preloader engine 512 may determine not to provide the preloader file. Alternatively, the preloader engine 512 could choose to preload all web files that contain at least one resource. If the preloader engine 512 determines not to provide a preloader file to the client, then the process continues to block 690 where the preloader engine 512 waits for the first web file from the origin server 112.

Returning to block 624, if the preloader engine 512 determines to provide a preloader file, then the preloader engine determines a URI of the preloader file, block 628. The step of determining a URI of the preloader file is discussed in later figures. After the preloader engine 512 determines the URI of the preloader file, the preloader engine 512 transmits a first response to the client. The first response to the client comprises the URI of the preloader file. The client receives the first response with the instruction to request the URI of the preloader file. The client makes a request for the preloader file, block 640. The HTTP request server 504 retrieves the preloader file from either the preloader cache 516 or the edge cache 508. And in block 644, the HTTP request server 504 transmits the preloader file to the client.

The preloader file contains instructions for requesting one or more resources and to request the first web file again. In block 648, the client requests the one or more resources. The one or more resources could be in one or a combination of the edge cache 508, the resource store 108, and the cache of another POP 120. The HTTP request server 504 retrieves the one or more resources and delivers the one or more resources to the client, block 652. The client stores the one or more resources in the browser cache 420, block 656.

In step 660, the client requests the first web file again, bringing the process back to block 604. The request this time is a third request for the first web file. The third request comprises a third URI. The third URI corresponds to the first web file. In one embodiment, the first URI and the third URI are the same. In another embodiment, the preloader file contains instructions to place the URI of the preloader file, or a portion of the URI of the preloader file, in the referer HTTP request header of the third request. In another embodiment, the third URI is different from the first URI. The third URI could be derived from parts of the first URI so that the preloader engine 512 can determine that the third request is later in time than the first request.

As with the first request, the third request is likewise transmitted by the HTTP request server 504, block 608, to the preloader engine 512, block 612, and to block 616. In block 616, the preloader engine 512 determines whether there was an earlier request for the first web file than the third request. To identify whether there was an earlier request than the third request, the preloader engine analyzes the referer HTTP request header of the third request. The preloader engine 512 matches the referer HTTP request header to the URI of the preloader file, or to a portion of the URI of the preloader file, and determines there was an earlier request for the first web file. In another embodiment, the preloader engine 512 uses a cookie to determine that there was an earlier request than the third request. Since the third request was not the first request, the answer is "no" and the process flows to block 680.

In block 680, the preloader engine 512 queries whether the origin server has sent the web file. If the answer is yes, then the process continues to block 684 where the preloader engine 512 delivers the first web file to the client. In one embodiment, the preloader file includes a semaphore request before an instruction to request the first web file again. The semaphore request is directed to the preloader engine 512. When the preloader engine 512 has received the first web file from the origin server 112, the preloader engine 512 provides a semaphore response to the semaphore request. The semaphore response could be empty or contain further instructions. After the browser 404 receives the semaphore response, the browser 404 follows the instruction to request the first web file again.

In block 688, the client renders the first web file to display a webpage for the end user 128. When the client renders the first web file, the browser 404 can retrieve the one or more resources from the browser cache 420. In one embodiment, multiple transactions between the client and POP 120 are summarized as a single event in a history of the browser 404. Also, when the first web file is rendered, the first URI displays in the browser 404. In one embodiment, the third request is an HTTP GET request triggered by a document.location.replace( ) instruction. In another embodiment, a response to deliver the first web fire to the client includes instructions to manipulate a displayed URI in the history of the browser 404 to display the first URI. In a further embodiment, the HTTP request headers of the first request are preserved.

Returning to block 680, if the preloader engine 512 has not received the first web file after the preloader engine 512 receives the third request for the first web file, the preloader engine may optionally determine to provide another preloader file in block 624. If a yes determination is made in block 624, then the preloader engine can provide the another preloader file with additional resources for the client to download. This process will continue until either the preloader engine 512 determines not to provide any more preloader files, block 690, or until the web file is received, block 680.

Figure 6B:
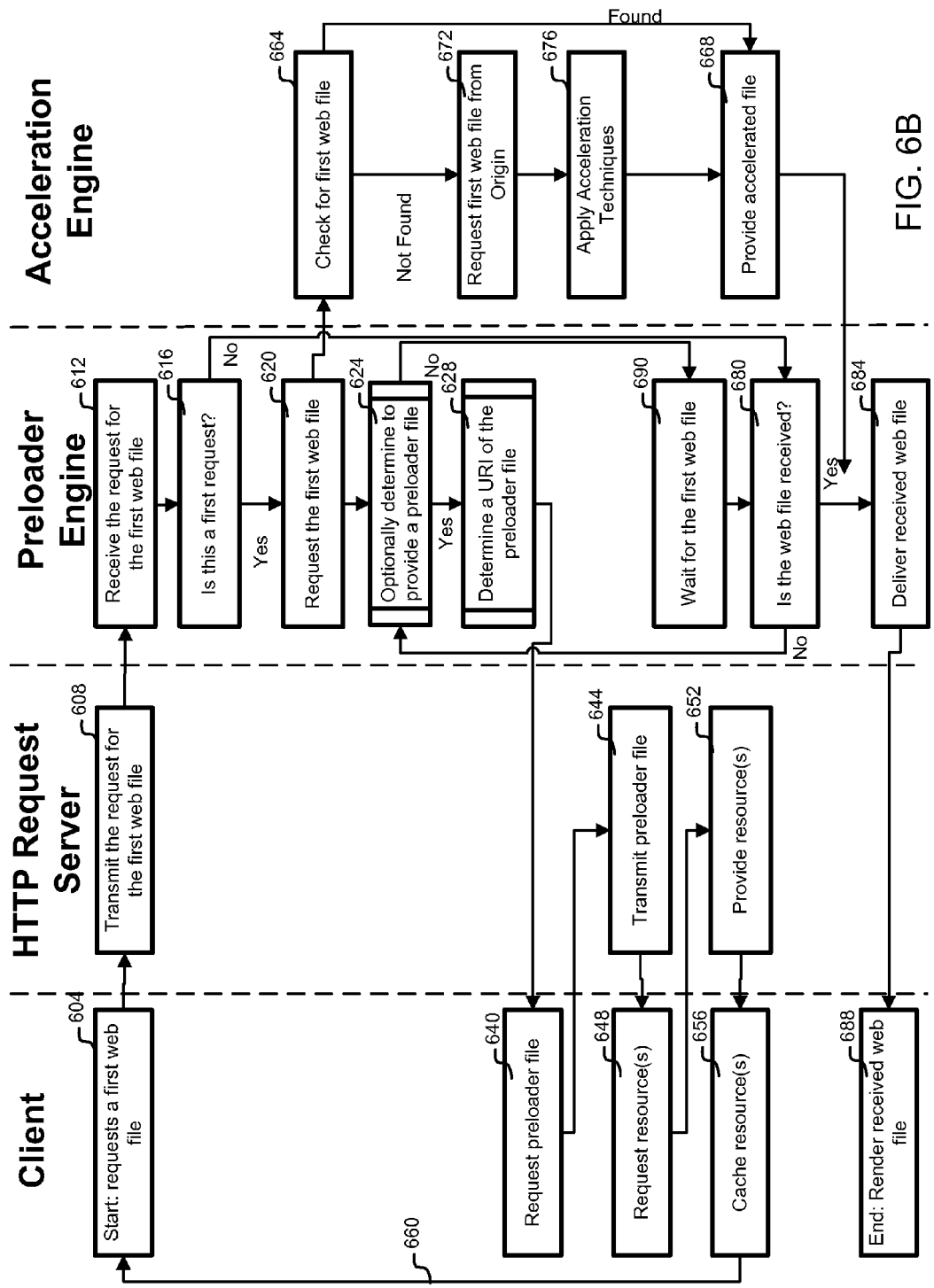

Referencing next to FIG. 6B, an illustration of a swim diagram for one embodiment with an acceleration engine 540 for delivery of a preloader file is shown. This process is similar to the process depicted in FIG. 6A, but departs from the previous process in block 620. Instead of the preloader engine 512 requesting the first web file from the origin server 112, the preloader engine 512 requests the first web file from the acceleration engine 540. In block 664, the acceleration engine 540 checks whether it has an accelerated version of the first web file. The acceleration engine 540 could check in a local cache or with other CDN servers in the CDN 110. If the acceleration engine 540 finds an accelerated version of the first web file, the process flows to block 668. In block 668 the acceleration engine 540 provides an accelerated file to the preloader engine 512. The accelerated file is similar to the first web file except an acceleration element 416 has been added and/or parts of the origin element 412 have been removed. In one embodiment, the preloader engine 512 passes information to the acceleration engine on resources the preloader file is already requesting. The acceleration engine 540 uses the information of the preloader file to create the acceleration file.

If the first web file is not found by the acceleration engine 540, the acceleration engine 540 requests the first web file from the origin server 112, block 672. In block 676, the acceleration engine 540 applies one or more acceleration techniques on the first web file to create the accelerated file.

Figure 7:
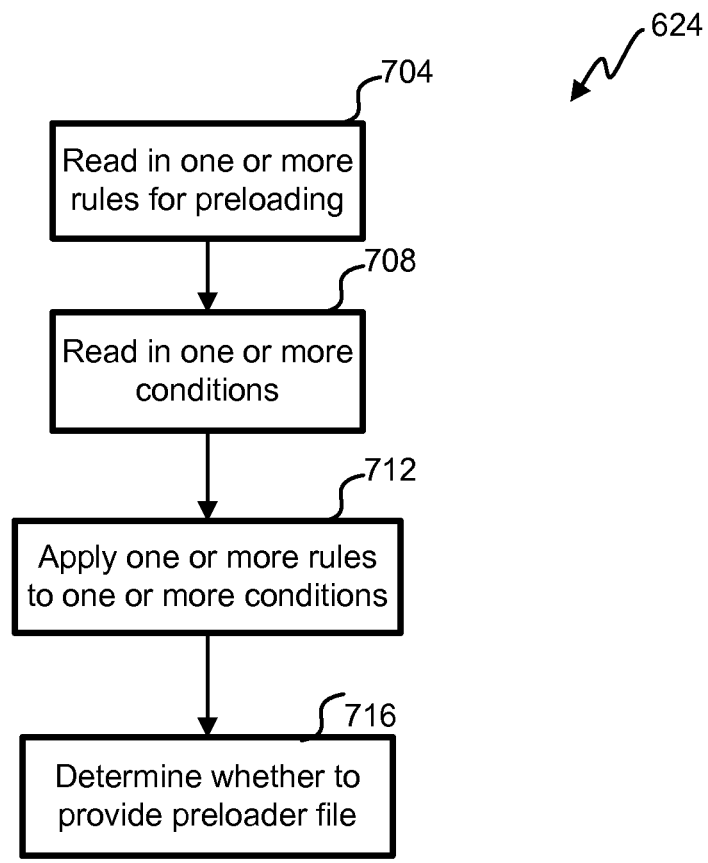
FIG. 7 illustrates a flow diagram of an embodiment that determines whether to send the preloader file in response to the request for the webpage.

Referring next to FIG. 7, a flow diagram of an embodiment that determines whether or not to send the preloader file is illustrated. This flow diagram provides more detail to block 624 in FIGS. 6A and 6B. To determine whether or not to provide a preloader file, the preloader engine 512 reads one or more rules, step 704, relating to preloading from the rules store 536. Criteria for not providing a preloader file include an origin server 112 that is close to the preloader engine 512, the first web file is relatively simple, resources for the first web file are already cached, or the process for providing multiple preloader files has reached a numerical threshold.

In block 708, the preloader engine 512 reads one or more conditions. The preloader engine 512 can gather the one or more conditions from the first or third request for the first web file, the edge cache 508, or from queries across the network 204. In block 712, the preloader engine 512 applies the one or more rules to the one or more conditions. In block 716, the preloader engine 512 makes a determination whether or not to provide a preloader file.

Figure 8A:
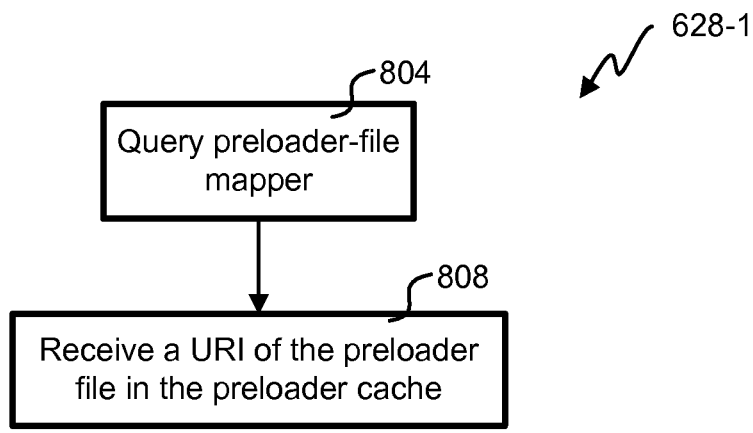
FIGS. 8A, 8B, and 8C illustrate flow diagrams for determining a URI of the preloader file.

Referring next to FIG. 8A, a flow diagram of one embodiment for determining the URI of the preloader file is illustrated. In process 628-1, the preloader engine 512 queries the preloader-file mapper 520 for the URI of the preloader file. The preloader-file mapper 520 uses the first URI of the first web file to find a corresponding URI of the preloader file. The preloader-file mapper 520 then returns the URI of the preloader file. The preloader engine 512 receives the URI of the preloader file in block 808.

Figure 8B:
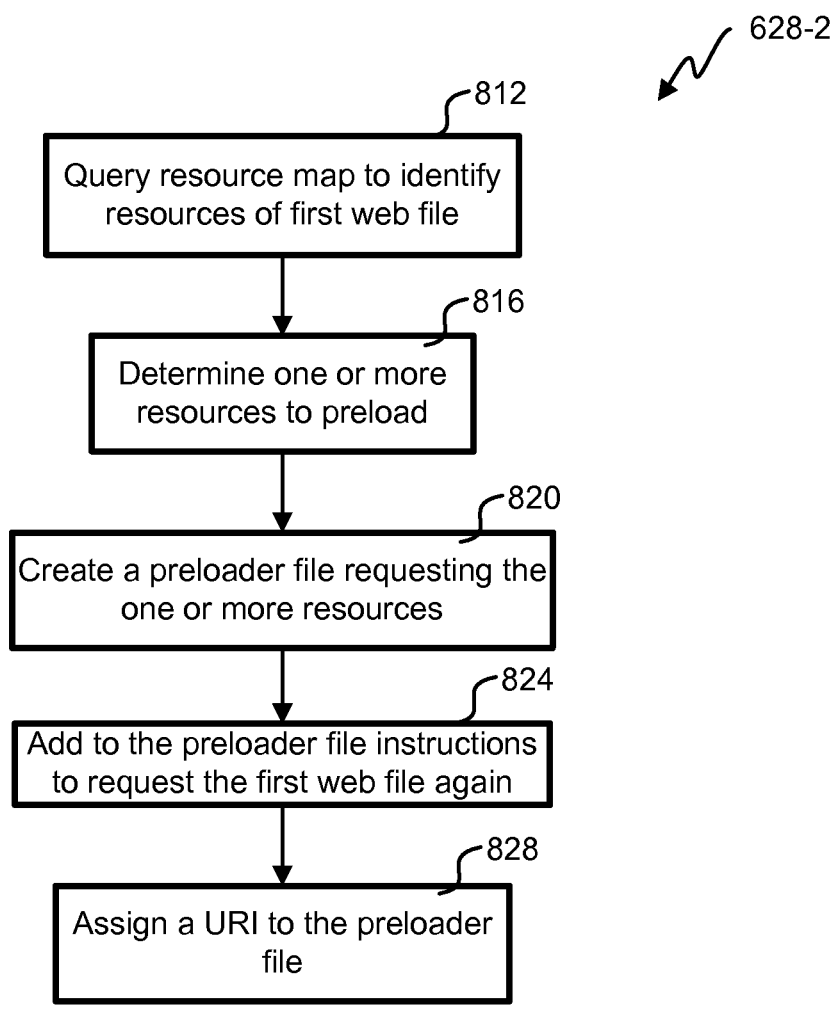

Referencing next to FIG. 8B, a flow diagram of another embodiment for determining the URI of the preloader file is illustrated. In process 628-2, the preloader engine 512 creates the preloader file after receiving a request for the first web file. In block 812 the preloader engine 512 queries the resource map 532 for a plurality of resources that may likely be used by the first web file. In block 816, the preloader engine 512 determines, from the plurality of resources, one or more resources to add to the preloader file by applying rules from the rules store 536. The preloader engine 512 then creates, in block 820, a preloader file that requests the one or more resources. In addition to requesting resources, the preloader engine 512 also creates instructions for the browser 404 to request the first web file again, block 824. The preloader engine 512 then assigns a URI to the preloader file and saves the preloader file in the preloader cache 516 or the edge cache 508, block 828.

Figure 8C:
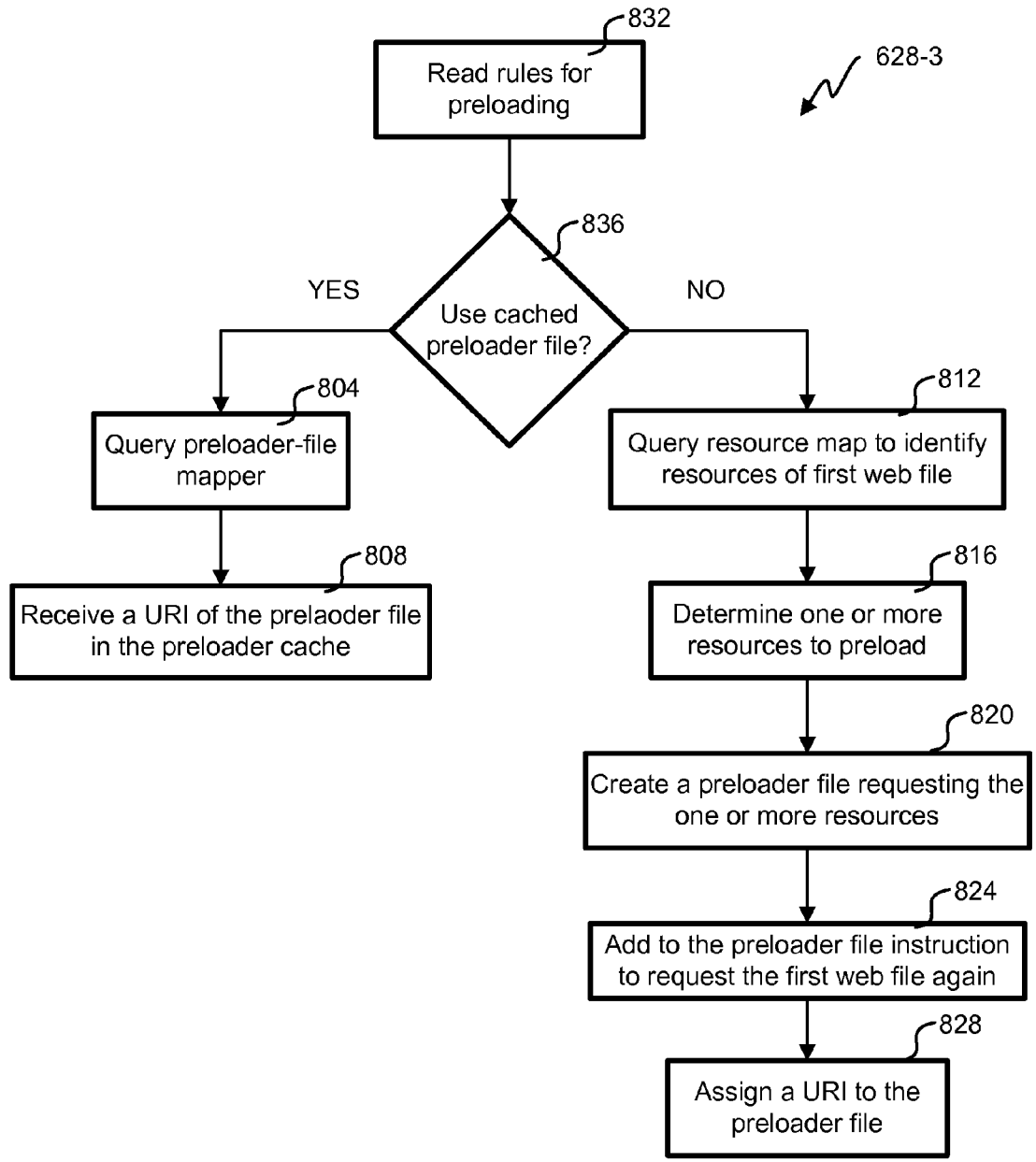

Referring next to FIG. 8C, a flow diagram of yet another embodiment for determining the URI of the preloader file is illustrated. Process 628-3 combines the process of 628-1 and 628-2 with the added functionality of determining whether to use a preloader file already in the preloader cache 516 or to create the preloader file. Process 628-3 starts at block 832 where the preloader engine 512 reads rules regarding how to handle preloading. For example, certain URIs may always use a preloader file from the preloader cache 516. In block 836, the preloader engine decides whether to use a preloader file from the preloader cache 516 or to create the preloader file. If the answer is to use a preloader file from the preloader cache 516, the process continues to step 804. Step 804 continues as it did in process 628-1. But if the preloader engine 512 determines to create the preloader file, then the process continues to step 812, which is similar to process 628-2. In this embodiment, the preloader engine 512 can select to use a preloader file already in the preloader cache 516 in response to the first request for the first web file, and select to create the preloader file in response to the third request for the first web file. For example, the preloader cache may contain a third preloader file with initial resources that are used for all requests relating to the domain www.cnn.com. An end user system 124 requesting a second web file in the domain of cnn.com would receive the third preloader file and download the initial resources. The end user system 124 would then make a second request for the second web file. When the preloader engine 512 receives the second request for the second web file, the preloader engine 512 could then decide, in step 836, to create a fourth preloader file. The fourth preloader file could be based on what resources were on the third preloader file and an amount of time the preloader engine 512 estimates that the preloader engine 512 will receive the second web file from the origin server 112.

A number of variations and modifications of the disclosed embodiments can also be used. For example, the embodiments are described within a context of a Content Delivery Network (CDN); other embodiments may not include a CDN. For example, the origin server 112 could create and/or store the preloader file. The origin server 112 could also perform the functions of the preloader engine 512. For example, the origin server 112 could determine whether to provide the preloader file, identify the URI of the preloader file, and determine that the third request for the first web file is received later in time than the first request for the first web file. Further, a number of embodiments have been in the context of creating a preloader file. Similar methods could be used to create a preloader response with a scripting language, such as JavaScript,™ with instructions similar to the instructions on the preloader file. In this embodiment, the client would not need to request the second URI to the preloader file. The preloader response would contain the instructions for downloading resources and instructing the client to request the first web file again.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for accelerating the loading of a webpage by providing a preloader file to a client's request for the webpage, the system comprising:
   a preloader engine, using a computer processor, configured to:
      receive a first request from the client for a first file,
         the first request comprising a first Uniform Resource Identifier (URI), and
         the first URI identifying the first file, wherein the first file is renderable by a browser as the webpage;
      determine a second URI, where:
         the second URI identifies a second file,
         the second file is different from the first file, and
         the second file is the preloader file configured to:
            request a first resource for download, the first resource likely to be a resource of a first plurality of resources of the first file, and
            request the first file again;
      send the client a first response, the first response comprising the second URI;
      request the first file from a server;
      receive a second request from the client for the first file,
         the second request comprising a third URI, and
         the third URI identifying the first file;
      determine that the second request for the first file is received later in time than the first request for the first file;
      receive the first file from the server; and
      transmit the first file to the client in response to the second request for the first file; and
   a preloader cache comprising a plurality of preloader files.

2. The system for accelerating the loading of the webpage by providing the preloader file to the client's request for the webpage as recited in claim 1, further comprising an HTTP request server configured to:
   receive a request for the second file;
   retrieve the second file from the preloader cache; and
   send the client the second file.

3. The system for accelerating the loading of the webpage by providing the preloader file to the client's request for the webpage as recited in claim 1, wherein:
   the second file is further configured to place at least a portion of the second URI into an HTTP request header of the second request; and
   the HTTP request header is the referer header.

4. The system for accelerating the loading of the webpage by providing the preloader file to the client's request for the webpage as recited in claim 1, the preloader engine further configured to:
   read a second HTTP request header of the second request for the first file, and
   determine that the second request for the first file was received later in time than the first request for the first file based on reading at least a portion of the second URI from the second HTTP request header.

5. The system for accelerating the loading of the webpage by providing the preloader file to the client's request for the webpage as recited in claim 1, wherein the first URI and the third URI are the same.

6. The method for accelerating the loading of the webpage by providing the preloader file to the client's request for the webpage as recited in claim 1, the preloader engine further configured to encrypt the second URI in the first response.

7. A method for accelerating the loading of a webpage by providing a preloader file to a client's request for the webpage, the method comprising:
   receiving a first request from the client for a first file,
      the first request comprises a first Uniform Resource Identifier (URI), and
      the first URI identifies the first file, wherein the first file is renderable by a browser as the webpage;
   determining a second URI, where:
      the second URI identifies a second file,
      the second file is different from the first file, and
      the second file is the preloader file configured to:
         request a first resource for download, the first resource likely to be a resource of a first plurality of resources of the first file, and
         request the first file again;
   sending the client a first response, the first response comprising the second URI directing the client to the preloader file;
   requesting the first file from a server;
   receiving a second request from the client for the first file,
      the second request comprises a third URI, and
      the third URI identifies the first file;
   determining that the second request for the first file is received later in time than the first request for the first file;
   receiving the first file from the server; and
   transmitting the first file to the client in response to the second request for the first file.

8. The method for accelerating the loading of the webpage by providing the preloader file to the client's request for the webpage as recited in claim 7, the method further comprising determining that there was not a third request for the first file from the client, where the third request was earlier in time than the first request.

9. The method for accelerating the loading of the webpage by providing the preloader file to the client's request for the webpage as recited in claim 7, wherein the determining that the second request for the first file is received later in time than the first request for the first file comprises:
   reading an HTTP request header of the second request for the first file, and
   analyzing the HTTP request header of the second request for the first file to determine the second request for the first file is received later in time than the first request for the first file.

10. The method for accelerating the loading of the webpage by providing the preloader file to the client's request for the webpage as recited in claim 7, wherein the second file uses a scripting language to request the first resource for download and request the first file again.

11. The method for accelerating the loading of the webpage by providing the preloader file to the client's request for the webpage as recited in claim 7, wherein the second file uses HTML constructs to request the first resource for download and request the first file again.

12. The method for accelerating the loading of the webpage by providing the preloader file to the client's request for the webpage as recited in claim 7, wherein the determining that the second request for the first file is received later in time than the first request for the first file comprises analyzing a cookie.

13. The method for accelerating the loading of the webpage by providing the preloader file to the client's request for the webpage as recited in claim 7, wherein the first URI and the third URI are the same.

14. The method for accelerating the loading of the webpage by providing the preloader file to the client's request for the webpage as recited in claim 7, wherein the second file loads more quickly into the browser of the client than the first file.

15. A content delivery network (CDN) having a plurality of Points of Presence (POPs) distributed geographically, one of the POPs of the plurality of POPs comprising:
one or more processors for executing instructions to:
receive a first request from the client for a first file,
the first request comprises a first Uniform Resource Identifier (URI), and
the first URI identifies the first file, wherein the first file is renderable by a browser as a webpage;
determine that there was not a second request for the first file from the client, where the second request was earlier in time than the first request;
query a first data store for a second URI,
the second URI is mapped to the first URI in the first data store, and
the second URI identifies a second file, the second file is a preloader file;
send the client a first response directing the client to the preloader file,
the first response comprising the second URI, and
the second file is configured to:
request a first resource for download, the first resource likely to be a resource of a first plurality of resources of the first file, and
request the first file again;
request the first file from a server;
receive the second request from the client for the first file,
the second request comprises a third URI, and
the third URI identifies the first file;
determine that the second request for the first file is received later in time than the first request for the first file;
receive the first file from the server; and
transmit the first file to the client in response to the second request for the first file.

16. The CDN having the plurality of POPs as recited in claim 15, wherein the first URI and the third URI are the same.

17. The CDN having the plurality of POPs as recited in claim 15, wherein the instructions further comprise instructions to:
read an HTTP request header of the second request for the first file, and
analyze the HTTP request header to determine that the second request for the first file was received later in time than the first request for the first file.

18. The CDN having the plurality of POPs as recited in claim 17, wherein the server is an origin server.

19. The CDN having the plurality of POPs as recited in claim 15, wherein the first response is an HTTP 303 redirect.

20. The CDN having the plurality of POPs as recited in claim 15, wherein the second file loads more quickly into the client's browser than the first file.

* * * * *